Nov. 17, 1959　　　G. F. BAUER　　　2,913,248
SADDLE ACTUATED HOBBY HORSE
Filed June 5, 1957　　　　　　　　　　　　　2 Sheets-Sheet 2
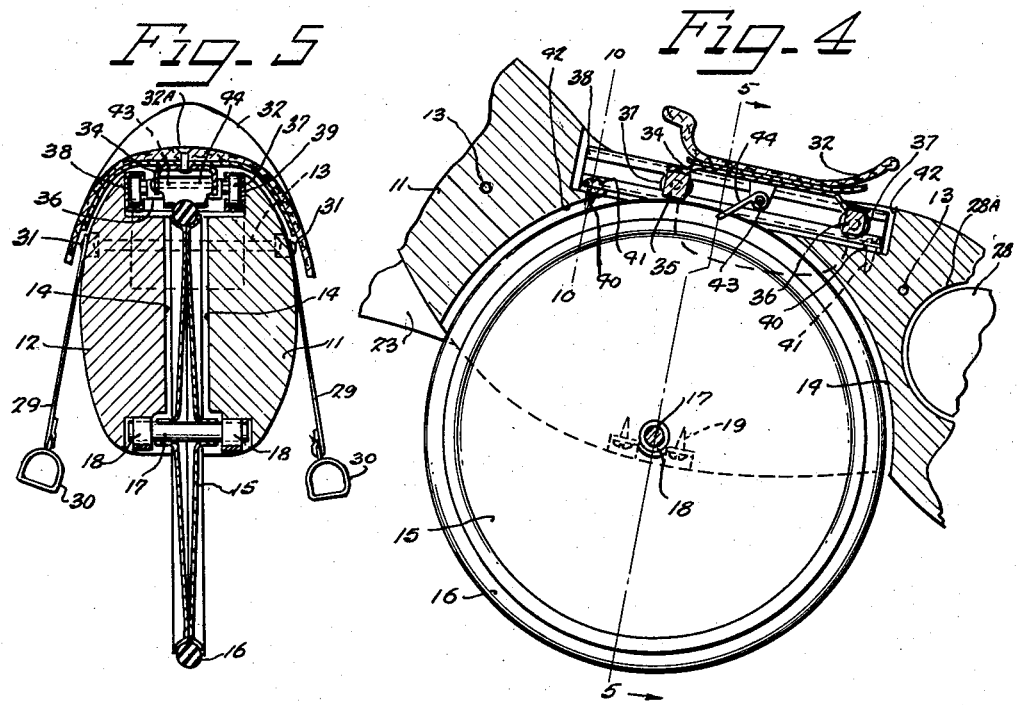
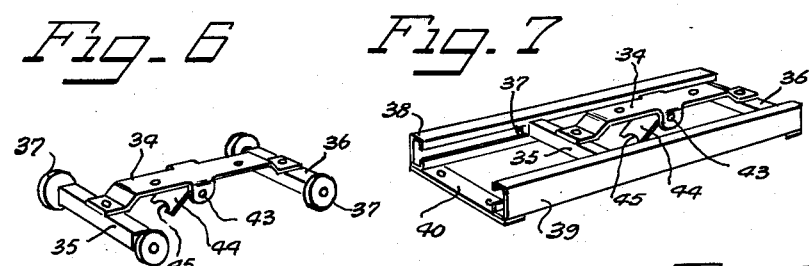
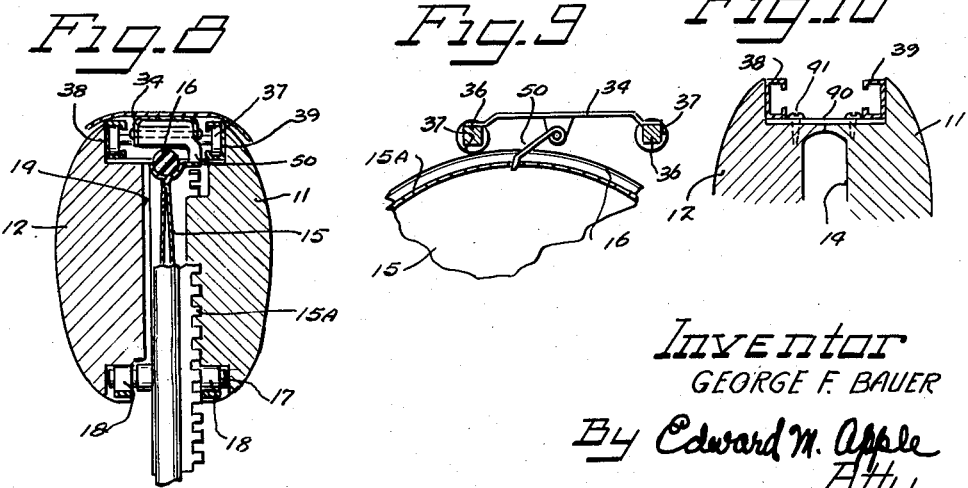
Inventor
GEORGE F. BAUER
By Edward M. Apple
Atty United States Patent Office 2,913,248
Patented Nov. 17, 1959

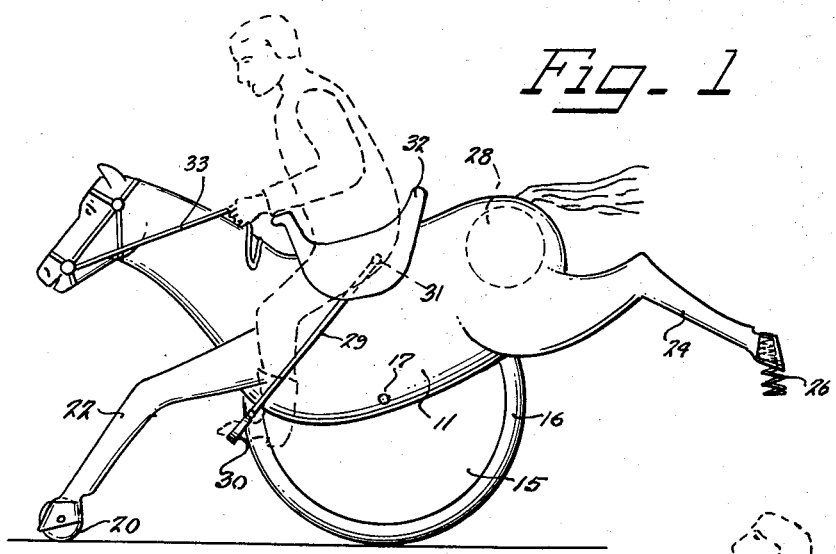
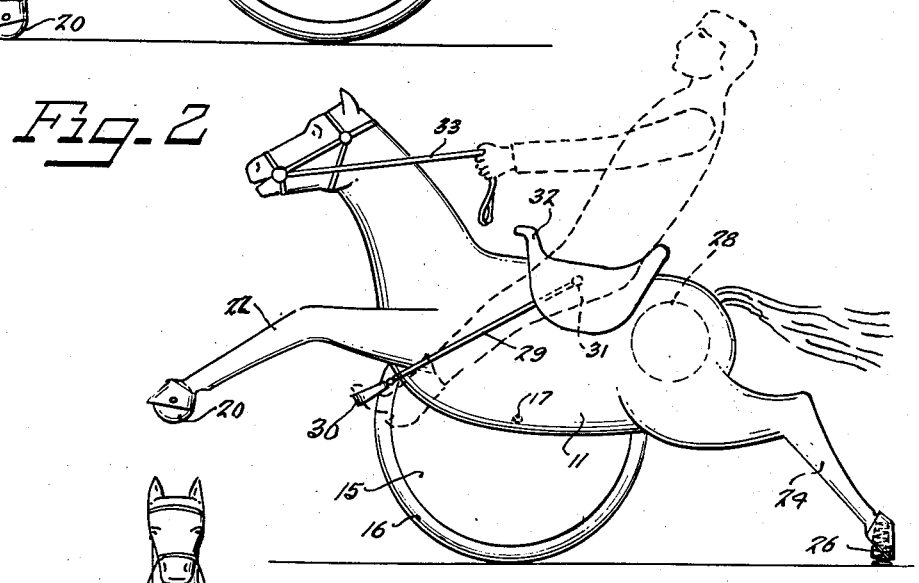
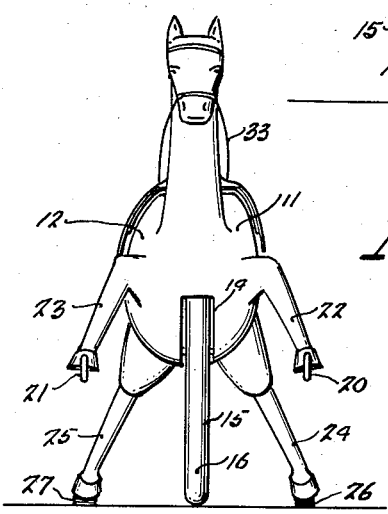

2,913,248

SADDLE ACTUATED HOBBY HORSE

George F. Bauer, Detroit, Mich.

Application June 5, 1957, Serial No. 663,710

1 Claim. (Cl. 280—1.183)

This invention relates to hobby horses and has particular reference to a hobby horse which is provided with means to produce a limited degree of locomotion.

An object of the invention is to provide a hobby horse which may be ridden by a child over any hard surface, such as a floor, side walk, or the like.

Another object of the invention is to provide a hobby horse, which is endowed with a factor of locomotion, so that a child riding the same may experience the excitement and thrill of a simulated horseback ride.

Another object of the invention is to provide a hobby horse of the character indicated, which is constructed and arranged with novel means for supporting and balancing the device when in operation.

Another object of the invention is to provide a device of the character indicated, which may be propelled by the energy of the rider.

Another object of the invention is to provide a hobby horse with a uni-cycle mounting and propulsion mechanism, with auxiliary means, for stabilizing and impelling the device.

Another object of the invention is to provide a device of the character indicated, which is simple in construction, economical to manufacture and assemble, and efficient in operation.

The foregoing and other objects and advantages of the invention will become more apparent as the description proceeds, reference being made from time to time to the accompanying drawings, forming part of the within disclosure, in which drawings:

Fig. 1 is a side elevational view of a device embodying the invention, with a rider shown in dotted lines, as he would appear on the horse at the instant the horse reached the end of its forward rocking motion.

Fig. 2 is a view similar to Fig. 1, but showing the position of the horse and rider at the moment the horse reached the end of its backward rocking motion.

Fig. 3 is a front elevational view of the device shown in Figs. 1 and 2.

Fig. 4 is a fragmentary, vertical section taken through the device along side of the wheel.

Fig. 5 is a vertical section taken substantially on the line 5—5 of Fig. 4.

Fig. 6 is a detail, in perspective, showing the carriage for supporting the saddle.

Fig. 7 is a detail, in perspective, showing the saddle carriage illustrated in Fig. 6, mounted on its supporting and retaining tracks.

Fig. 8 is a fragmentary, vertical section taken through a device embodying a modified form of the invention.

Fig. 9 is a fragmentary detail, showing part of the driving mechanism disclosed in the modified form illustrated in Fig. 8.

Fig. 10 is a fragmentary, vertical section taken substantially on the line 10—10 of Fig. 4.

Referring now more particularly to the invention, it will be understood that the hobby horse illustrated in Figs. 1, 2 and 3 is preferably made in two longitudinal halves 11—12, which may be made of wood, plastic or other suitable material, and which are held together by means of tie rods 13 (Figs. 4 and 5) or other suitable means. Each section 11—12 is formed with a central cutout portion 14, which is arranged to receive the upper portion of the wheel 15, which is rubber tired as at 16, which wheel rotates on a suitable spindle 17, which is provided with bearings 18, which are secured by any suitable means such as screws 19, in an enlarged portion of the central opening 14. The wheel 15 is the principal supporting element for the hobby horse, but stability is given to the hobby horse by means of rollers 20 and 21 which are respectively mounted to the front legs 22 and 23 of the hobby horse.

The wheel 15 and the rollers 20 and 21 provide a three point support for the horse during its forward motion. The rear legs 24 and 25 are respectively provided with coil springs 26 and 27, which springs strike the ground as the hobby horse reaches the end of its rearward rocking motion, as shown in Fig. 2. The springs 26 and 27 prevent the hobby horse from tipping over at the end of the rearward rocking motion, and the force of the compression of the springs initiate, and assist in, the next forward rocking motion of the hobby horse.

It will be understood that the spindle 17 is positioned in a plane, which bisects the body of the hobby horse transversely, so that there may be a forward and rearward rocking motion imparted to the body of the hobby horse. The forward and rearward rocking motion is motivated by the movement of the rider, and the saddle, as hereinafter explained.

The hobby horse may be counter-balanced with weights, as at 28, which assist in getting the device over dead center on the rearward rocking motion. These weights may roll freely in the recesses 28A, a limited distance, to cause a clicking noise, simulating the clatter of horses' hoofs on a road. It will also be understood that the straps 29, which support the stirrups 30, are secured directly to the body, as at 31, and not to the saddle 32, as in conventional practice. This mounting of the stirrups 30 to the body, together with the rider's pull on the reins 33, enables the rider to shift his weight forwardly and rearwardly on the hobby horse, to effect a rocking motion on the spindle 17, and the locomotion of the device as hereinafter explained.

Instead of securing the saddle 32 rigidly to the body 11—12, I provide the saddle 32 with a carriage mounting 34, which enables it to travel forwardly and rearwardly under the shifting weight of the rider. The saddle 32 is preferably mounted to the carriage 34 (Fig. 5) by rivets 32A. The carriage is provided with axles 35 and 36, at the ends of which are rollers 37, which are arranged to travel in channel members 38 and 39 which are held in spaced relation by means of cross members 40 (Fig. 7), which are secured to the body by means of screws 41, or other suitable means. The partly closed channels 38 and 39 prevent the upward displacement of the carriage and saddle. The carriage 34, 37, channel members 38 and 39, and cross members 40 are all recessed in an opening 42, provided in the hobby horse body 11—12. The ends of the recess 42 serve as limiting means for the forward and backward travel of the carriage 34.

Pivotally mounted to the underside of the carriage 34, as at 43, (Figs. 4—7) is an impeller 44, which has a grooved end 45 (Fig. 6), which angularly impinges on outer periphery of the tire 16, upon the forward movement of the carriage 34, in the channel tracks 38 and 39. This causes a forward rotating movement of the wheel 15, and provides the locomotion for the hobby horse. On the rearward movement of the carriage 34, the impeller 44 slides across the tire 16 without effect.

Thus it will be seen that the action of the device embodies a forward and rearward rocking motion of the horse about the spindle 17, as a pivot, as the rider shifts his weight from front to back. In addition thereto, on the forward rocking action of the horse, there is imparted a forward rotation to the wheel 15, which provides the forward location of the hobby horse. The forward locomotion of the body is imparted to the rollers 20 and 21, as the hobby horse reaches the end of its forward rocking action. There is nothing to impede the continued forward locomotion of the hobby horse, as the weight of the rider is shifted from back to front, therefore, the horse will continue to travel forward. When the weight of the rider is shifted from the front to the rear, as shown in Fig. 2, the rear springs 26 and 27 will be compressed, and the recoil of these springs 26 and 27, will initiate, and assist in, the next forward rocking motion. The action is repeated. Thus it will be seen that the rider may experience the sensation of an actual horse back ride, by simply shifting his weight from front to rear and vice versa.

In Figs. 8 and 9 I show a modified form of means for rotating the wheel 15. In this embodiment the wheel 15 is provided with a toothed rim 15A, the teeth of which are arranged to receive a pivoted pawl 50, which causes the forward rotation of the wheel 15 under the influence of the forward movement of the carriage 34 as previously described. Upon the rearward movement of the carriage 34 (Fig. 9) the pawl 50 will drag, without effect, over the teeth of the rim 15A in the same manner as in the description of the impeller 44.

It is believed that the operation of the device is obvious from the foregoing description.

Having described my invention, what I claim and desire to secure by Letters Patent is:

A hobby horse comprising in combination, a body, having four legs, a large, centrally disposed wheel for supporting said body, and a saddle mounted for forward and backward rolling motion on said body, said saddle having tangentially operating means associated therewith for motivating said wheel, the said body being provided with a recess, in which is loosely mounted a circular counter-weight, which counter-weight is free to roll in said recess a limited distance, whereby to create a sound, which simulates the clatter of horses' hoofs, as said body is rocked forwardly and backwardly on said large wheel.

References Cited in the file of this patent

UNITED STATES PATENTS

| | | |
|---|---|---|
| 1,479,930 | Robeson | Jan. 8, 1924 |
| 2,518,899 | Kelleher | Aug. 15, 1950 |
| 2,768,833 | Sidoff | Oct. 30, 1956 |

FOREIGN PATENTS

| | | |
|---|---|---|
| 211,231 | Germany | June 25, 1909 |
| 244,341 | Germany | Mar. 7, 1912 |
| 196,434 | Great Britain | Apr. 26, 1923 |